(12) United States Patent
Seagle

(10) Patent No.: US 7,961,437 B2
(45) Date of Patent: Jun. 14, 2011

(54) MAGNETIC RECORDING HEAD HAVING AN EXTENDED STRIPE HEIGHT AND A SHORTENED SHIELD HEIGHT

(75) Inventor: David J Seagle, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 929 days.

(21) Appl. No.: 11/863,190

(22) Filed: Sep. 27, 2007

(65) Prior Publication Data
US 2009/0086380 A1    Apr. 2, 2009

(51) Int. Cl.
*G11B 5/39* (2006.01)
(52) U.S. Cl. ......................................... 360/319
(58) Field of Classification Search .................. None
See application file for complete search history.

(56) References Cited

U.S. PATENT DOCUMENTS

| | | | |
|---|---|---|---|
| 5,731,937 A | 3/1998 | Yuan | |
| 6,198,609 B1 | 3/2001 | Barr et al. | |
| 6,456,465 B1 * | 9/2002 | Louis et al. | 360/319 |
| 6,510,030 B1 | 1/2003 | Song et al. | |
| 6,512,661 B1 * | 1/2003 | Louis | 360/324.12 |
| 6,603,642 B1 | 8/2003 | Araki et al. | |
| 6,724,582 B2 | 4/2004 | Funayama et al. | |
| 6,731,475 B2 | 5/2004 | Ikeda | |
| 6,757,143 B2 | 6/2004 | Tunayama et al. | |
| 6,762,915 B2 | 7/2004 | Pokhil et al. | |
| 6,914,757 B2 | 7/2005 | Yuasa et al. | |
| 7,093,347 B2 | 8/2006 | Nowak et al. | |
| 7,116,528 B2 | 10/2006 | Nagasaka et al. | |
| 7,130,162 B2 | 10/2006 | Seyama et al. | |
| 7,372,674 B2 * | 5/2008 | Gill | 360/324.2 |
| 7,706,109 B2 * | 4/2010 | Nichols et al. | 360/324.2 |
| 2005/0030673 A1 | 2/2005 | Oshima et al. | |
| 2006/0067010 A1 | 3/2006 | Kagami et al. | |
| 2006/0092564 A1 * | 5/2006 | Le | 360/126 |
| 2008/0180863 A1 * | 7/2008 | Gill | 360/324.2 |

FOREIGN PATENT DOCUMENTS

| | | |
|---|---|---|
| JP | 2003298144 | 10/2003 |
| JP | 2007012186 | 1/2007 |

* cited by examiner

*Primary Examiner* — Mark Blouin
(74) *Attorney, Agent, or Firm* — Duft Bornsen & Fishman, LLP

(57) ABSTRACT

Magnetic recording heads and associated methods of fabrication are disclosed. A magnetic recording head has a first shield and a magnetoresistance (MR) read element formed on the first shield. The first shield has a shield height that is defined by a distance between the air bearing surface (ABS) of the recording head and a back edge of the first shield that is opposite the ABS. The MR read element has a stripe height that is defined by a distance between the air bearing surface (ABS) of the recording head and a back edge of the MR read element that is opposite the ABS. The magnetic recording heads as disclosed herein have a stripe height that is greater than the shield height.

24 Claims, 7 Drawing Sheets

MAGNETIC RECORDING HEAD HAVING AN EXTENDED STRIPE HEIGHT AND A SHORTENED SHIELD HEIGHT

BACKGROUND OF THE INVENTION

1. Field of the Invention

The invention is related to the field of magnetic recording heads, and, in particular, to a magnetic recording head having a magnetoresistance (MR) read element with an extended stripe height, and having a shield with a shortened shield height as compared to the stripe height.

2. Statement of the Problem

Many computer systems use magnetic disk drives for mass storage of information. Magnetic disk drives typically include one or more magnetic recording heads (sometimes referred to as sliders) that include read elements and write elements. A suspension arm holds the recording head above a magnetic disk. When the magnetic disk rotates, an air flow generated by the rotation of the magnetic disk causes an air bearing surface (ABS) side of the recording head to ride a particular height above the magnetic disk. The height depends on the shape of the ABS. As the recording head rides on the air bearing, an actuator moves an actuator arm that is connected to the suspension arm to position the read element and the write element over selected tracks of the magnetic disk.

As the read element passes over the bits and bit transitions recorded on tracks of the magnetic disk, the magnetic fields for the bits and bit transitions modulate the resistance of the read element. The change in resistance of the read element is detected by passing a sense current through the read element, and then measuring the change in bias voltage across the read element. The resulting read back signal is used to recover the data encoded on the track of the magnetic disk.

The structure of a typical recording head includes a first shield, a read element formed on the first shield, two hard bias magnets formed on either side of the read element, and a second shield formed on the read element. The read element may comprise a Giant MR (GMR) read element, a Tunneling MR (TMR) read element, or another type of read element. If the recording head is being operated in a current perpendicular to the planes (CPP) fashion, then the first shield and the second shield are electrically connected to opposing surfaces of the read element to act as current leads for the sense current.

The read element in the recording head has a defined stripe height and track width. The stripe height comprises the distance between a back edge (which is the edge opposite the ABS) of the read element and the ABS. The stripe height and track width defines the resistance exhibited by the read element.

The first shield of the recording head has a shield height, which comprises the distance between a back edge (which is the edge opposite the ABS) of the first shield and the ABS. The shield height of the first shield is many times greater than the stripe height of the read element. For instance, a typical shield height may be 10, 20, or 30 microns, while a typical stripe height may be about 60 nanometers. The reason that the stripe height is constrained to a shorter height is that it forces the sense current that is applied through the read element to the region near the ABS of the read element. This region is where the flux from a recording transition on a magnetic disk is located allowing for improved readability of the bits on the magnetic disk.

One problem however with a read element having a shorter stripe height is that the read element is more susceptible to thermal magnetic resistance noise. Thermal magnetic resistance noise is inversely proportional to the volume of the read element. Thus, as the volume of the read element is lowered in order to force the sense current toward the ABS of the read element, the thermal magnetic resistance noise of the read element is increased. This unfortunately leads to a lower signal to noise ratio in the read element.

SUMMARY OF THE SOLUTION

The invention solves the above and other related problems with a CPP magnetic recording head having a read element with an extended stripe height. The extended stripe height increases the volume of the read element which reduces the thermal magnetic resistance noise in the read element and allows for higher signal to noise ratios. The magnetic recording head also has a first shield with a defined shield height that is less than the stripe height of the read element. The shorter shield height in a CPP recording head forces the sense current that is applied through the read element to the region near the ABS of the read element. Thus, even with the extended stripe height, the shortened shield height forces the sense current to the ABS of the read element allowing the read element to effectively sense transitions in an adjacent magnetic disk.

One embodiment of the invention comprises a CPP magnetic recording head comprising a first shield and an MR read element formed on the first shield. The first shield has a back edge opposite the ABS of the recording head that defines a shield height of the first shield. Similarly, the MR read element has a back edge opposite the ABS of the recording head that defines a stripe height of the MR read element. The stripe height of the MR read element is greater than the shield height of the first shield. This structure effectively reduces the thermal magnetic resistance noise in the MR read element while still forcing the sense current that is applied through the MR read element to the region near the ABS.

The invention may include other exemplary embodiments described below. For instance, additional embodiments may comprise methods of fabricating the recording head described above.

DESCRIPTION OF THE DRAWINGS

The same reference number represents the same element or same type of element on all drawings.

DETAILED DESCRIPTION OF THE INVENTION

Figure 1:
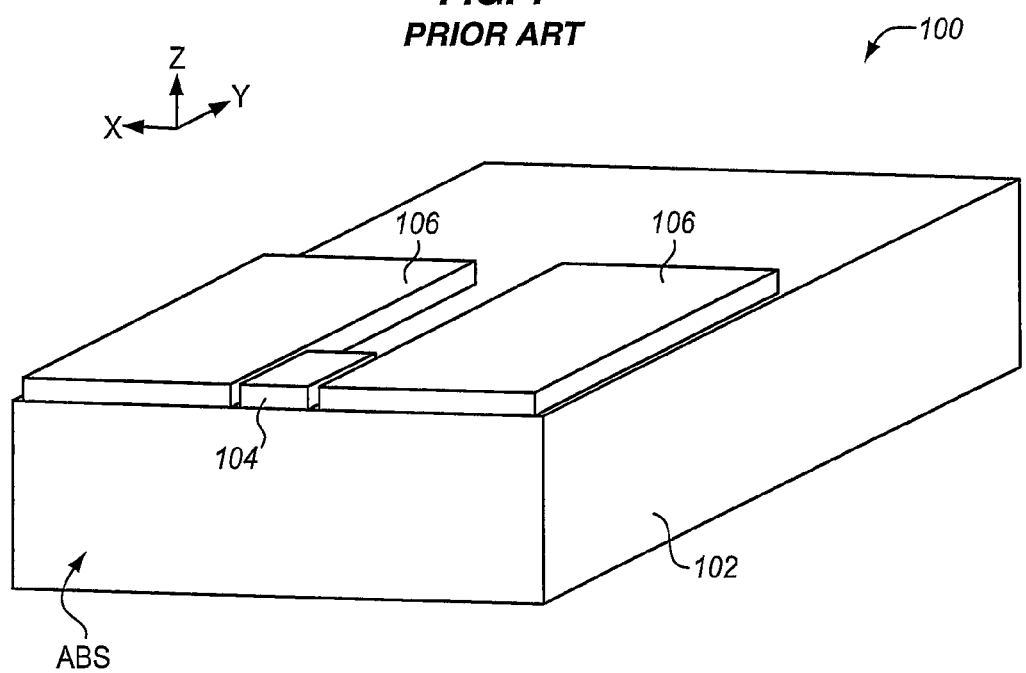
FIG. 1 is an isometric view of a recording head in the prior art.
Figure 2:
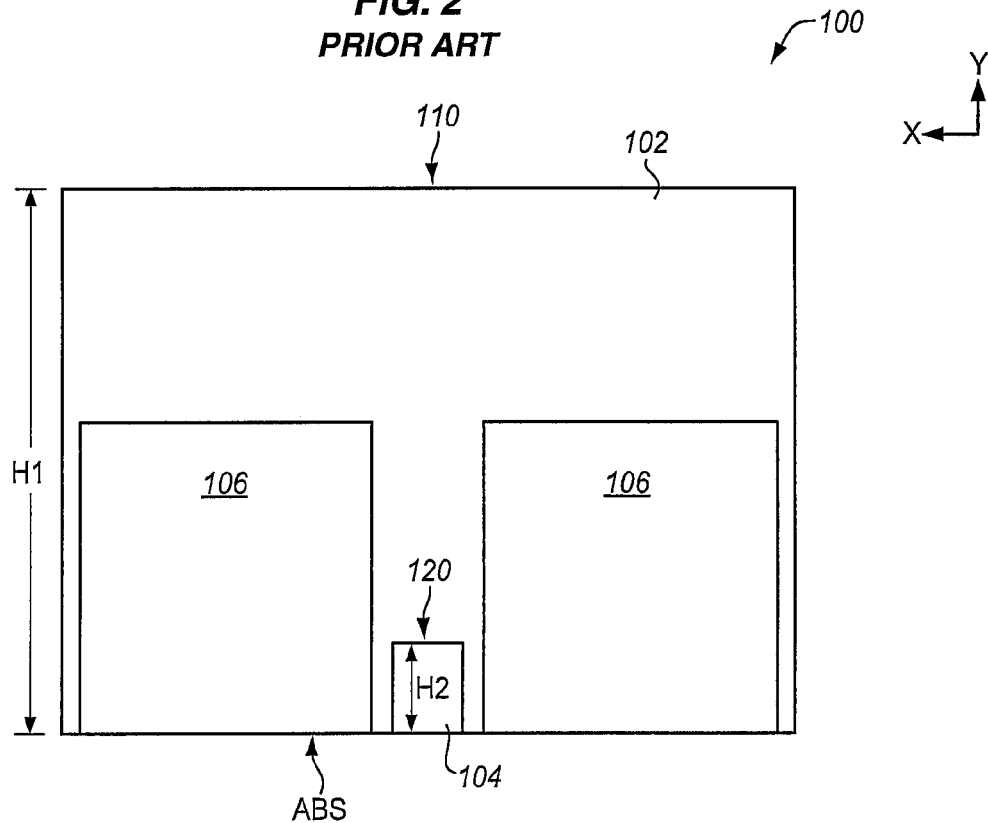
FIG. 2 is a top view of a recording head in the prior art.
Figure 3:
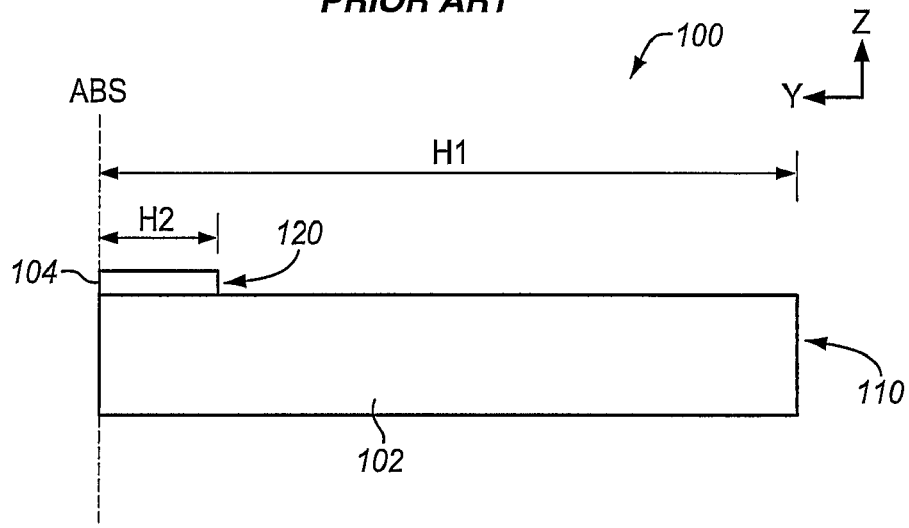
FIG. 3 is a cross-sectional view of a recording head in the prior art.

FIGS. 1-3 illustrate the structure of a conventional recording head. FIG. 1 is an isometric view of recording head 100. Recording head 100 includes a first shield 102, a MR read element 104 formed on top of first shield 102, and hard bias magnets 106 formed on either side of read element 104. Recording head 100 will also include a second shield (not shown) that is formed on top of read element 104 and hard bias magnets 106. FIG. 1 is not drawn to scale, as first shield 102 may extend much further in the X, Y, or Z directions.

FIG. 2 is a top view of recording head 100. Recording head 100 is oriented such that the ABS of recording head 100 is toward the bottom in FIG. 2. FIG. 3 is a cross-sectional view of recording head 100. Recording head 100 is oriented such that the ABS of recording head 100 is toward the left in FIG. 3. These figures illustrate the height of first shield 102 as compared to the height of read element 104.

In FIGS. 2-3, first shield 102 has a back edge 110 that is opposite the ABS side of first shield 102. The distance between back edge 110 and the ABS side of first shield 102 defines the height (H1) of first shield 102, which is referred to herein as the shield height. Read element 104 has a back edge 120 that is opposite the ABS side of read element 104. The distance between back edge 120 and the ABS side of read element 104 defines the height (H2) of read element 104, which is referred to herein as the stripe height.

As is evident in FIGS. 2-3, the stripe height of read element 104 is less than the shield height of first shield 102. FIGS. 2-3 are not drawn to scale. However, to illustrate the difference between the stripe height and the shield height in FIGS. 2-3, the stripe height is typically about 60 nanometers while the shield height is typically about 20 microns.

FIGS. 4-15 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 4:
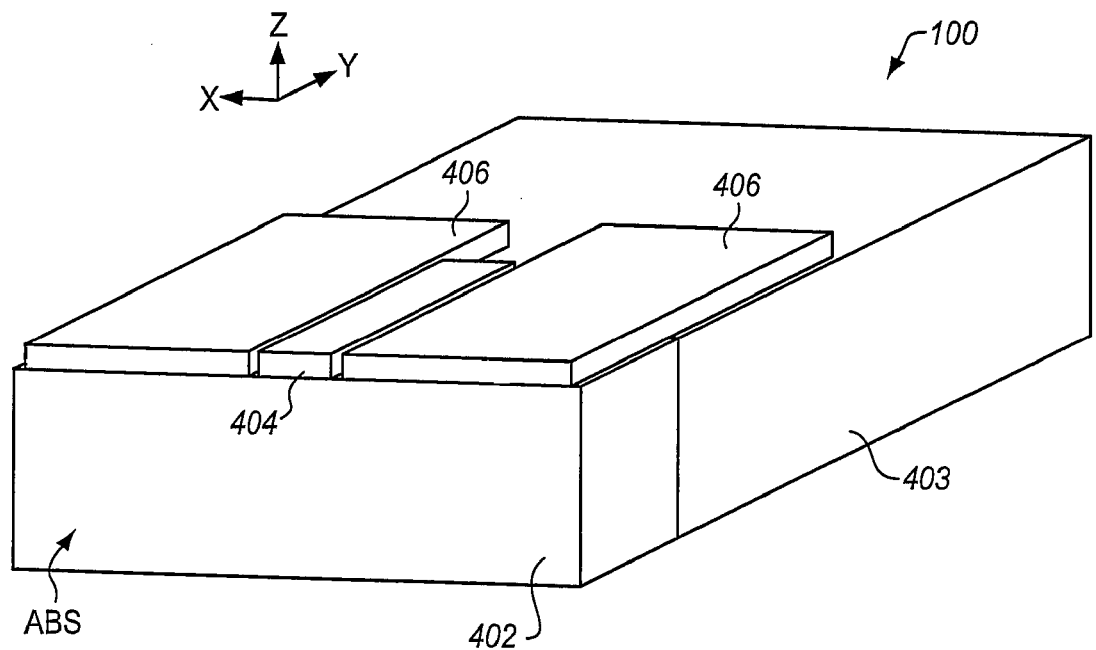
FIG. 4 is an isometric view of a recording head in an exemplary embodiment of the invention.
Figure 5:
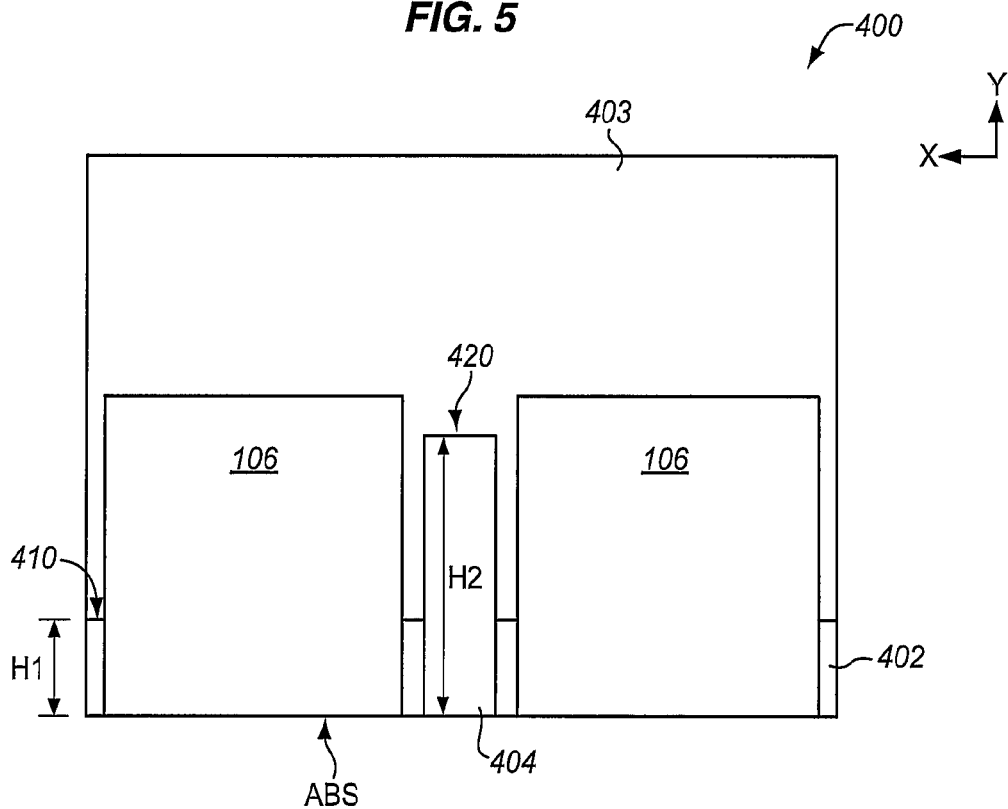
FIG. 5 is a top view of a recording head in an exemplary embodiment of the invention.
Figure 6:
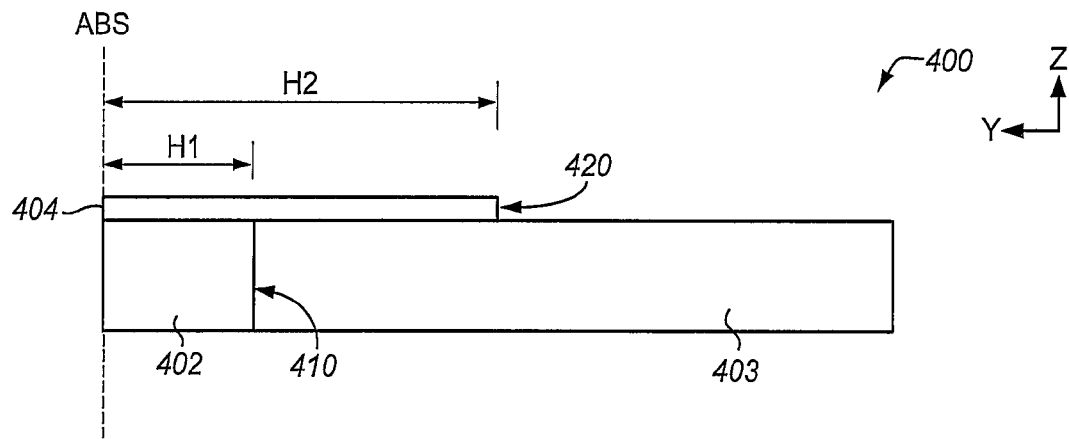
FIG. 6 is a cross-sectional view of a recording head in an exemplary embodiment of the invention.

FIGS. 4-6 illustrate the structure of a CPP magnetic recording head in an exemplary embodiment of the invention. FIG. 4 is an isometric view of recording head 400 in an exemplary embodiment of the invention. Recording head 400 includes a first shield 402, an insulating layer 403, a MR read element 404 formed on top of first shield 402 and insulating layer 403, and hard bias magnets 406 formed on either side of read element 404. FIG. 4 differs from FIG. 1 in that first shield 402 has a shorter height than first shield 102. Much of the height of first shield 402 is replaced with insulating layer 403. Also, read element 404 has a greater height than read element 104. Read element 404 is thus formed partially on first shield 402 and insulating layer 403. Read element 404 may comprise a GMR read element, a TMR read element, or another type of MR read element.

Recording head 400 will also include a second shield (not shown) that is formed on top of read element 404 and hard bias magnets 406. Recording head 400 is operated in a CPP fashion so that first shield 402 and the second shield may be electrically connected to read element 404. FIG. 4 illustrates just one embodiment, as recording head 400 may not include hard bias magnets 406 in other embodiments.

FIG. 5 is a top view of recording head 400 in an exemplary embodiment of the invention. Recording head 400 is oriented such that the ABS of recording head 400 is toward the bottom in FIG. 4. FIG. 6 is a cross-sectional view of recording head 400. Recording head 400 is oriented such that the ABS of recording head 400 is toward the left in FIG. 6. These figures illustrate the height of first shield 402 as compared to the height of read element 404.

In FIGS. 5-6, first shield 402 has a back edge 410 that is opposite the ABS side of first shield 402. The distance between back edge 410 and the ABS side of first shield 402 defines the shield height (H1) of first shield 402. Read element 404 has a back edge 420 that is opposite the ABS side of read element 404. The distance between back edge 420 and the ABS side of read element 404 defines the stripe height (H2) of read element 404.

As is evident in FIGS. 5-6, the stripe height of read element 404 is greater than the shield height of first shield 402. FIGS. 5-6 are not drawn to scale. However, to illustrate the difference between the stripe height and the shield height in FIGS. 5-6, the stripe height of read element 404 may be at least 1.25 times the shield height of first shield 402. An exemplary stripe height of read element 404 is at least 0.0125 microns, such as between about 0.0125 and 0.025 microns. An exemplary shield height of first shield 402 is 0.01 microns or less.

The extended stripe height of read element 404 increases the volume of read element 404 as compared to conventional read elements (see FIGS. 2-3). The increased volume reduces the thermal magnetic resistance noise in read element 404 and allows for higher signal to noise ratios. The shorter shield height of first shield 402 as compared to conventional first shields (see FIGS. 2-3) forces the sense current that is applied through read element 404 to the region near the ABS. Thus, even with the extended stripe height, the shortened shield height forces the sense current to the ABS of read element 404 allowing read element 404 to effectively sense transitions in an adjacent magnetic disk (not shown).

Figure 7:
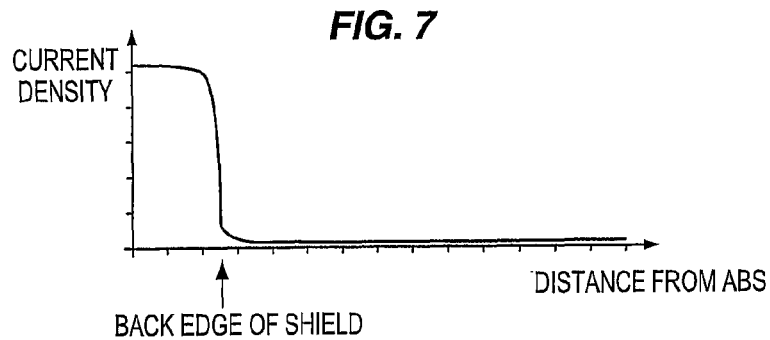
FIG. 7 is a graph illustrating the current density through a read element in an exemplary embodiment of the invention.

FIG. 7 is a graph illustrating the current density through read element 404 in an exemplary embodiment of the invention. Due to the shield height of first shield 402, the current density of a sense current is high toward the ABS side of read element 404. The current density remains high through the length of read element 404 until the back edge 410 of first shield 402. After the back edge 410 of first shield 402, the current density drops to about zero. FIG. 7 thus illustrates that a sense current applied through read element 404 is still forced to a region near the ABS of read element 404 even though the stripe height of read element 404 has been extended.

Figure 8:
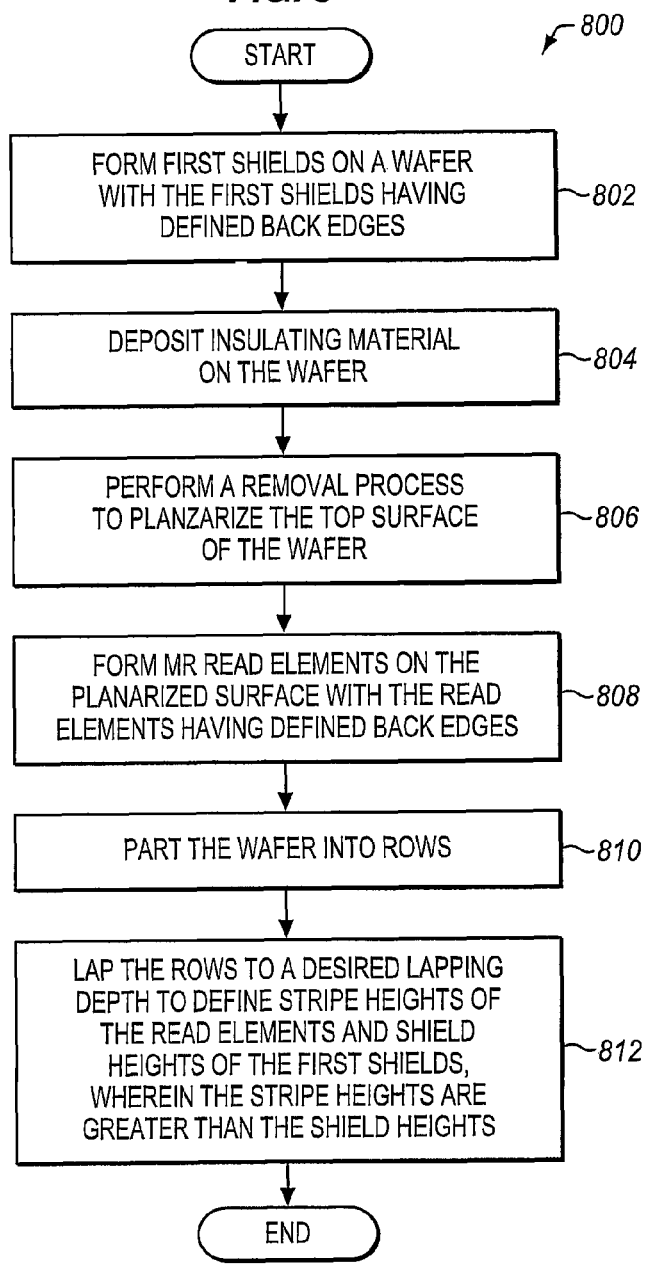
FIG. 8 is a flow chart illustrating a method of fabricating a magnetic recording head in an exemplary embodiment of the invention.

FIG. 8 is a flow chart illustrating a method 800 of fabricating a magnetic recording head in an exemplary embodiment of the invention. The steps of the flow chart in FIG. 8 are not all inclusive and may include other steps not shown. Method 800 illustrates wafer-level fabrication of magnetic recording heads, which ultimately results in recording head 400 such as illustrated in FIGS. 4-6. However, recording head 400 may be fabricated according to other methods than illustrated in FIG. 8.

Step 802 comprises forming first shields on a wafer. The forming process of step 802 defines back edges of the first shields relative to the future ABS of the recording heads. The first shields may be formed through a plating process or some other process. For an example of the plating process, resist material may be formed on the wafer to define the shape of the first shields. The shield material (e.g., NiFe) is then plated onto the wafer. The first shields are thus formed in the areas of the wafer that are exposed by the resist material with defined back edges. The resist material may then be removed.

Figure 9:
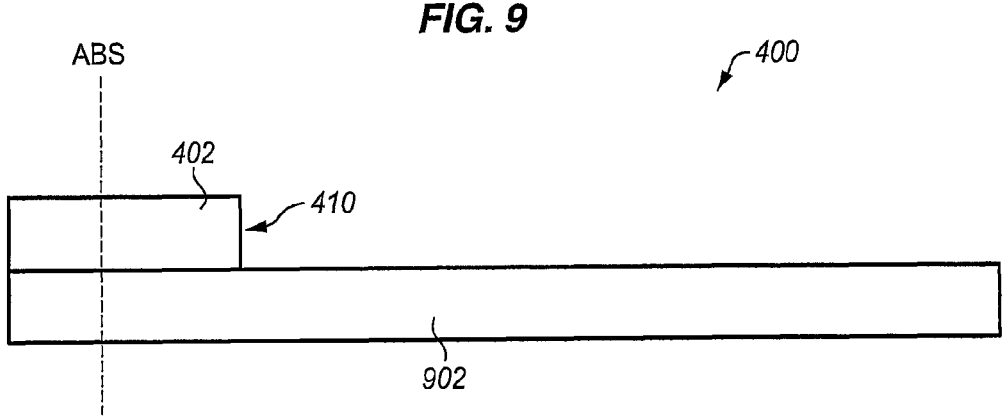
FIG. 9 is a side view illustrating a first shield formed on a wafer in an exemplary embodiment of the invention.

FIG. 9 is a side view illustrating a first shield 402 formed on a wafer 902 in an exemplary embodiment of the invention. FIG. 9 illustrates a single recording head 400, but those skilled in the art understand that other recording heads on the wafer are formed in a similar manner. Shield 402 has a back edge 410 that is defined in the forming process of step 802. FIG. 9 also illustrates the future ABS of recording head 400 that is being fabricated according to method 800.

Figure 10:
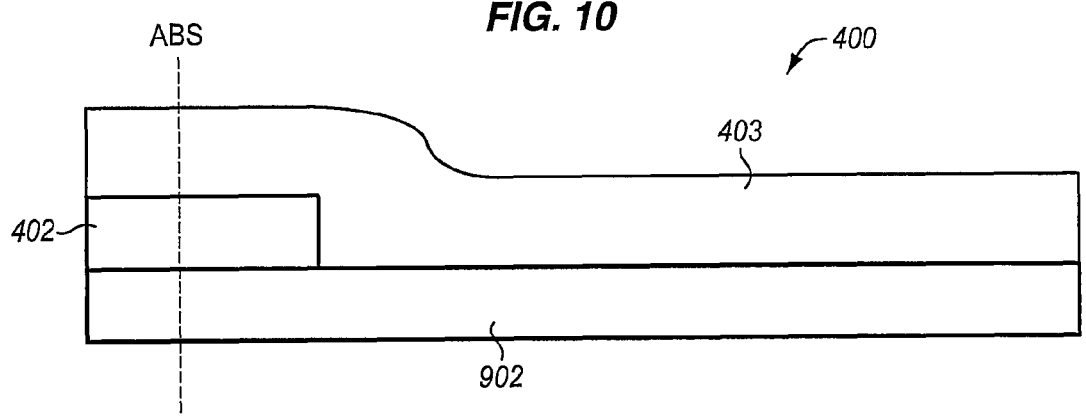
FIG. 10 is a side view illustrating an insulating material deposited on a wafer in an exemplary embodiment of the invention.

Step 804 of FIG. 8 comprises depositing insulating material (e.g., alumina) on the wafer. FIG. 10 is a side view illustrating insulating material 403 deposited on wafer 902 in an exemplary embodiment of the invention. This is a full film deposition step. Thus, insulating material 403 is deposited on first shield 402 and on areas of wafer 902 that are not covered with first shield 402.

Figure 11:
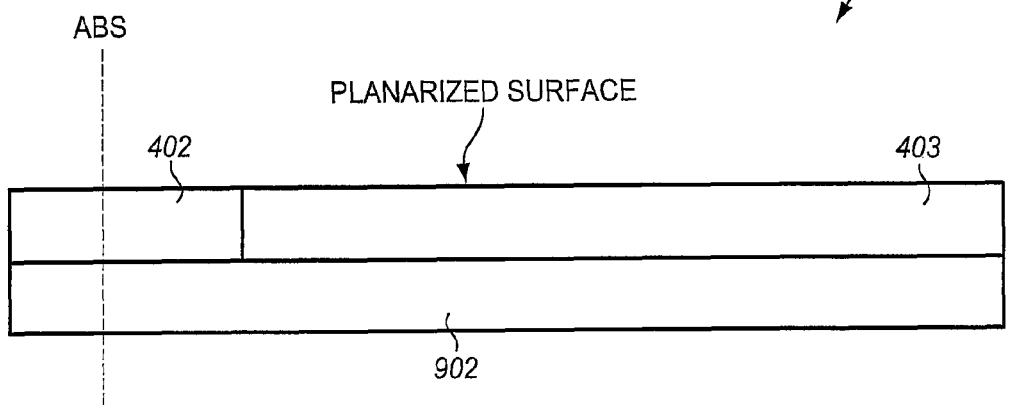
FIG. 11 is a side view illustrating a wafer with the top surface planarized in an exemplary embodiment of the invention.

Step 806 of FIG. 8 comprises performing a removal process to planarize the top surface of the wafer. For example, the removal process may comprise performing a Chemical/Mechanical Polishing (CMP) process to planarize the top surface of the wafer. FIG. 11 is a side view illustrating wafer 902 with the top surface planarized according to step 806.

Step 808 of FIG. 8 comprises forming MR read elements on the planarized surface. The forming process of step 808 defines back edges of the read elements relative to the future ABS of the recording heads. For an example of the forming process, full film depositions of the layers of the read elements may be performed. One or more photolithography steps may then be performed to define the track width of the read elements and an initial stripe height. The initial stripe height definition step defines the back edges of the read elements.

Figure 12:
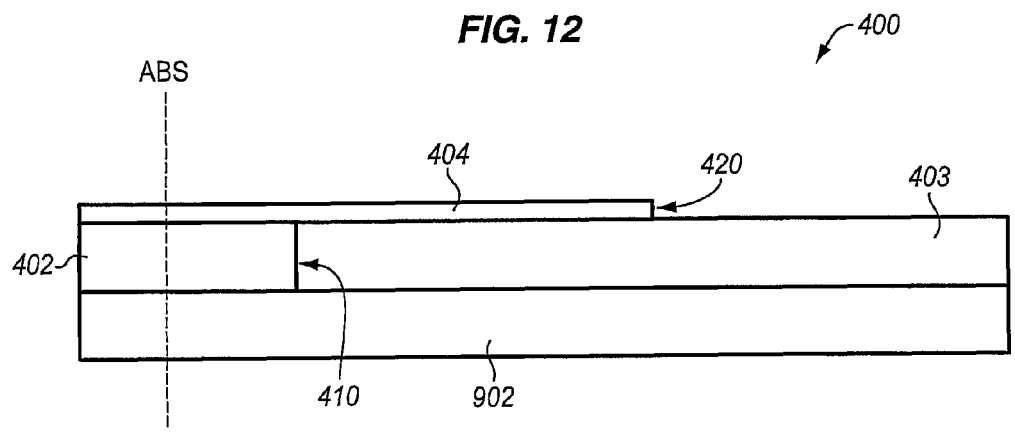
FIG. 12 is a side view illustrating a read element formed on a wafer in an exemplary embodiment of the invention.

FIG. 12 is a side view illustrating a read element 404 formed on wafer 902 in an exemplary embodiment of the invention. Read element 404 has a back edge 420 that is defined according to step 808. In this embodiment, the back edge 420 of read element 404 is defined to be further from the future ABS of recording head 400 than the back edge 410 of first shield 402.

At this point, method 800 may comprise further steps of forming other layers of the recording heads. For example, method 800 may further include forming hard bias layers on side regions of the read elements. Method 800 may further include forming second shields for the recording heads. After the recording heads are formed at the wafer level, the wafer is commonly parted for further processing.

Step 810 of FIG. 8 comprises parting the wafer into rows to allow for row-level processing. Although the wafer is parted into rows in the embodiment, the wafer may be cut in other desired ways to allow for further fabrication.

Figure 13:
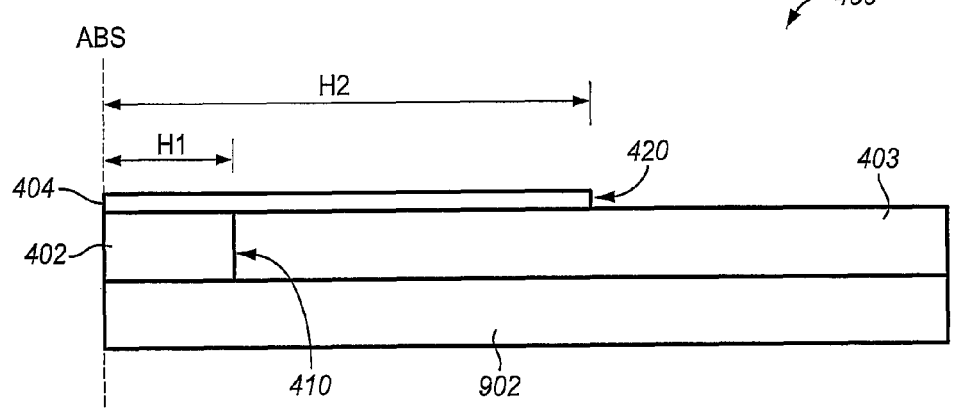
FIG. 13 is a side view illustrating a recording head after a lapping process in an exemplary embodiment of the invention.

Step 812 of FIG. 8 comprises lapping the rows to a desired lapping depth. The lapping process defines the ABS of the recording heads. The lapping process also defines a final stripe height of the read elements and a final shield height of the first shields in the rows. FIG. 13 is a side view illustrating recording head 400 after the lapping process in an exemplary embodiment of the invention. After the lapping process, the ABS of recording head 400 is defined. Also, the stripe height of read element 404 and the shield height of first shield 402 are defined. As is evident in FIG. 13, the stripe height (H2) of read element 404 is greater than the shield height (H1) of first shield 402.

Figure 14:
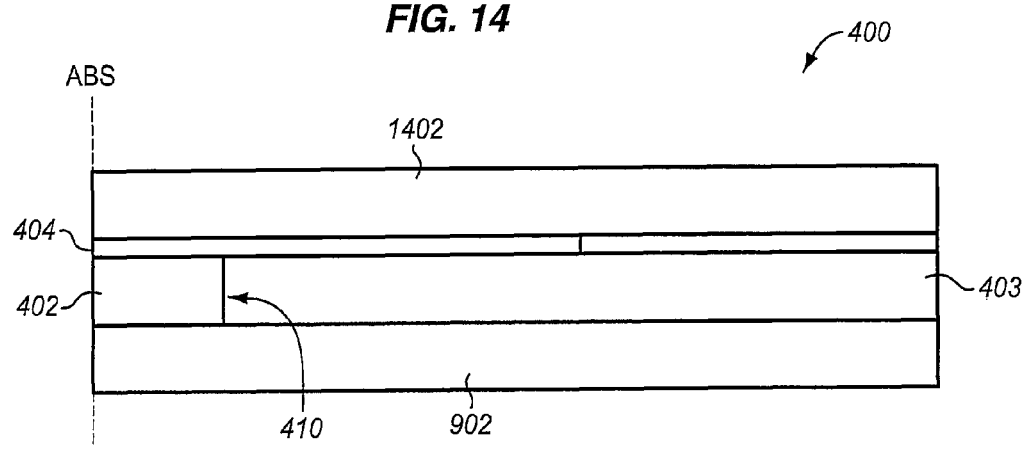
FIG. 14 is a side view of a recording head with a second shield in an exemplary embodiment of the invention.

As previously stated, method 800 may include the further step of forming second shields on the read elements. FIG. 14 is a side view of recording head 400 with a second shield 1402 in an exemplary embodiment of the invention. FIG. 14 is provided to show where second shield 1402 in relation to first shield 402 and read element 404.

The recording heads described above may be implemented in a magnetic disk drive system. The recording heads may also be implemented in memories or other magnetic applications.

Figure 15:
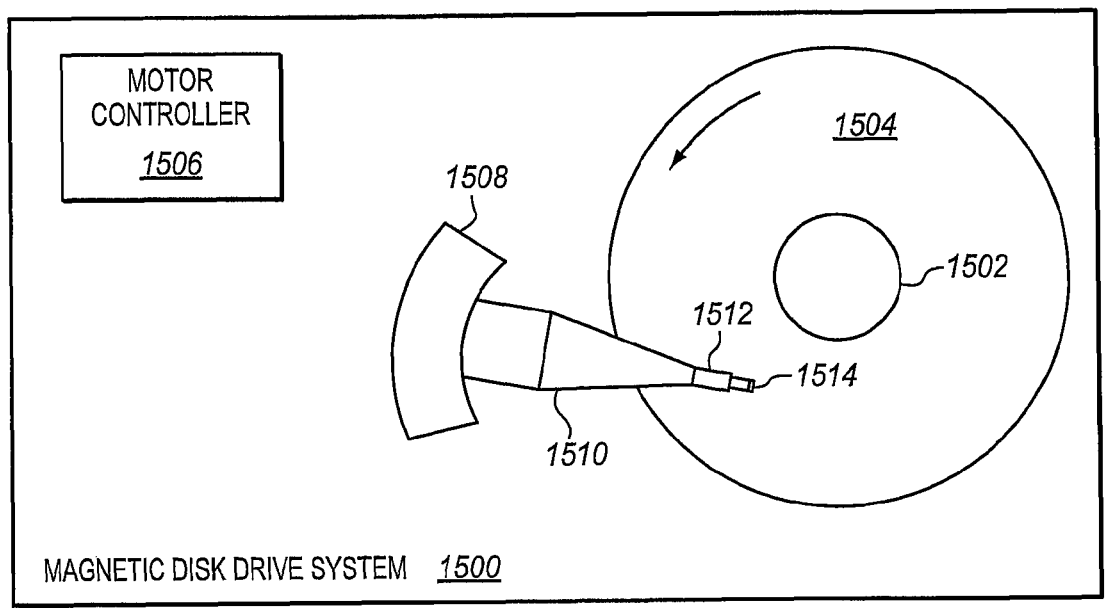
FIG. 15 illustrates a magnetic disk drive system in an exemplary embodiment of the invention.

FIG. 15 illustrates a magnetic disk drive system 1500 in an exemplary embodiment of the invention. Magnetic disk drive system 1500 includes a spindle 1502, a magnetic recording medium 1504, a motor controller 1506, an actuator 1508, an actuator arm 1510, a suspension arm 1512, and a recording head 1514. Spindle 1502 supports and rotates magnetic recording medium 1504 in the direction indicated by the arrow. A spindle motor (not shown) rotates spindle 1502 according to control signals from motor controller 1506. Recording head 1514 is supported by suspension arm 1512 and actuator arm 1510. Actuator arm 1510 is connected to actuator 1508 that is configured to rotate in order to position recording head 1514 over a desired track of magnetic recording medium 1504. Magnetic disk drive system 1500 may include other devices, components, or systems not shown in FIG. 15. For instance, a plurality of magnetic disks, actuators, actuator arms, suspension arms, and recording heads may be used.

When magnetic recording medium 1504 rotates, an air flow generated by the rotation of magnetic disk 1504 causes an air bearing surface (ABS) of recording head 1514 to ride on a cushion of air at a particular height above magnetic disk 1504. The height depends on the shape of the ABS. As recording head 1514 rides on the cushion of air, actuator 1508 moves actuator arm 1510 to position a read element (not shown) and a write element (not shown) in recording head 1514 over selected tracks of magnetic recording medium 1504.

Although specific embodiments were described herein, the scope of the invention is not limited to those specific embodiments. The scope of the invention is defined by the following claims and any equivalents thereof.

I claim:

1. A magnetic recording head, comprising:
a first shield having a defined shield height; and
a magnetoresistance (MR) read element formed on the first shield and having a defined stripe height;
wherein the shield height of the first shield is less than the stripe height of the MR read element to force a sense current applied to the magnetic recording head toward an air bearing surface (ABS) side of the MR read element.

2. The magnetic recording head of claim 1 wherein the stripe height is at least 1.25 times the shield height.

3. The magnetic recording head of claim 1 wherein the stripe height is at least 0.0125 microns and the shield height is less than 0.01 microns.

4. The magnetic recording head of claim 1 further comprising a second shield formed on the MR read element.

5. The magnetic recording head of claim 1 wherein the MR read element comprises a Giant MR (GMR) read element.

6. The magnetic recording head of claim 1 wherein the MR read element comprises a Tunneling MR (TMR) read element.

7. A magnetic disk drive system comprising:
a magnetic recording medium; and
a recording head adapted to read from the magnetic recording medium, the recording head comprising:
  a first shield having a back edge opposite an air bearing surface (ABS) of the recording head that defines a shield height of the first shield; and
  a magnetoresistance (MR) read element formed on the first shield and having a back edge opposite the ABS that defines a stripe height of the MR read element;
  wherein the shield height of the first shield is less than the stripe height of the MR read element to force a sense current applied to the recording head toward the ABS side of the MR read element.

8. The magnetic disk drive system of claim 7 wherein the stripe height is at least 1.25 times the shield height.

9. The magnetic disk drive system of claim 7 wherein the stripe height is at least 0.0125 microns and the shield height is less than 0.01 microns.

10. The magnetic disk drive system of claim 7 wherein the recording head further comprises:
a second shield formed on the MR read element.

11. The magnetic disk drive system of claim 7 wherein the MR read element comprises a Giant MR (GMR) read element.

12. The magnetic disk drive system of claim 7 wherein the MR read element comprises a Tunneling MR (TMR) read element.

13. A method of fabricating a magnetic recording head, the method comprising:
forming a first shield having a shield height; and
forming a magnetoresistance (MR) read element on the first shield, wherein the MR read element has a stripe height;
wherein the shield height of the first shield is less than the stripe height of the MR read element to force a sense current applied to the magnetic recording head toward an air bearing surface (ABS) side of the MR read element.

14. The method of claim 13 wherein the stripe height is at least 1.25 times the shield height.

15. The method of claim 13 wherein the stripe height is at least 0.0125 microns and the shield height is less than 0.01 microns.

16. The method of claim 13 wherein forming a MR read element on the first shield comprises:
forming a Giant MR (GMR) read element on the first shield.

17. The method of claim 13 wherein forming a MR read element on the first shield comprises:
forming a Tunneling MR (TMR) read element on the first shield.

18. A method of fabricating a magnetic recording head, the method comprising:
forming first shields having defined back edges on a wafer;
depositing insulating material on the wafer;
performing a removal process to planarize the top surface of the wafer;
forming magnetoresistance (MR) read elements on the planarized surface of the first shields and the insulating material, wherein the MR read elements have defined back edges;
parting the wafer into rows; and
lapping the rows to form an air bearing surface (ABS) for the magnetic recording heads;
wherein a distance between the ABS and the back edges of the MR read elements opposite the ABS defines stripe heights of the MR read elements;
wherein a distance between the ABS and the back edges of the first shields opposite the ABS defines shield heights of the first shields;
wherein the shield heights of the first shields are less than the stripe heights of the MR read elements.

19. The method of claim 18 wherein the stripe heights are at least 1.25 times the shield heights.

20. The method of claim 18 wherein the stripe heights are at least 0.0125 microns and the shield heights are less than 0.01 microns.

21. The method of claim 18 further comprising:
forming second shields on the MR read elements.

22. The method of claim 18 wherein forming first shields on a wafer comprises:
plating the first shields on the wafer.

23. The method of claim 18 wherein forming MR read elements on the planarized surface comprises:
forming Giant MR (GMR) read elements.

24. The method of claim 18 wherein forming MR read elements on the planarized surface comprises:
forming Tunneling MR (TMR) read elements.

* * * * *